(12) United States Patent
Lei (10) Patent No.: US 7,536,407 B2
(45) Date of Patent: May 19, 2009

(54) MANAGING ENTITY-RELATIONSHIP DATA FOR DATA OBJECTS PERSISTED IN A RELATIONAL DATABASE

(75) Inventor: Yang Lei, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 460 days.

(21) Appl. No.: 10/886,894

(22) Filed: Jul. 8, 2004

(65) Prior Publication Data

US 2006/0010094 A1    Jan. 12, 2006

(51) Int. Cl.
*G06F 17/30* (2006.01)
(52) U.S. Cl. .................. 707/102; 707/1; 707/5
(58) Field of Classification Search ............ 707/102, 707/1, 5; 715/243
See application file for complete search history.

(56) References Cited

U.S. PATENT DOCUMENTS

| | | | |
|---|---|---|---|
| 4,398,720 A | | 8/1983 | Jones et al. |
| 4,888,690 A | * | 12/1989 | Huber ........................... 707/4 |
| 5,018,073 A | | 5/1991 | Goldberg et al. |
| 6,694,220 B1 | | 2/2004 | Tanz |
| 7,155,464 B2 | * | 12/2006 | Belov ......................... 707/204 |
| 2002/0005333 A1 | | 1/2002 | Mondie et al. |
| 2002/0073236 A1 | | 6/2002 | Helgeson et al. ............ 709/246 |
| 2003/0141165 A1 | | 7/2003 | Reznik et al. |
| 2003/0229610 A1 | | 12/2003 | Van Treeck .................... 707/1 |
| 2004/0139116 A1 | * | 7/2004 | Porter ...................... 707/104.1 |

OTHER PUBLICATIONS

Johnson, Mark, "A beginner's guide to Enterprise JavaBeans", JavaWorld, at http://www.javaworld.com (Oct. 1998).
Bertino, Guerrini, "Extending the ODMG Object Model with Composite Objects" Universita di Milano, OOPSLA '98 ACM, Vancouver B.C. 1998.

* cited by examiner

*Primary Examiner*—Hosain T. Alam
*Assistant Examiner*—Johnese Johnson
(74) *Attorney, Agent, or Firm*—Yee & Associates, P.C.

(57) ABSTRACT

The present invention comprises a process for managing entity-relationship data for data objects persisted in a relational database. In particular, the process minimizes the number of database operations needed to maintain persistent referential integrity between data objects, thereby minimizing the number of times that a program accesses the database. In the preferred embodiment, the inventive process is implemented as an improved container program having a CMR engine that controls the persistence of data object relationships in a relational database. The improved container program comprises one or more referential integrity rules, which control the container program's response to a client object program's instructions that affect entity-relationship data.

1 Claim, 6 Drawing Sheets

MANAGING ENTITY-RELATIONSHIP DATA FOR DATA OBJECTS PERSISTED IN A RELATIONAL DATABASE

FIELD OF THE INVENTION

The present invention generally relates to data processing apparatus and corresponding methods for managing data stored in a database. In particular, the present invention relates to managing operations on entity-relationship data objects persisted in a relational database to maintain referential integrity between the data objects.

BACKGROUND OF THE INVENTION

In general, a database is any collection of information organized for rapid search and retrieval. A database stored in a computer-readable medium commonly is modeled as a collection of one or more tables. Each table, in turn, is modeled as a collection of one or more records (referred to commonly as a "row"), and each record as a collection of one or more fields (referred to commonly as a "column"). In a conventional table, all records comprise the same number and type of fields, and in the same order. A "relational" database consists of tables that are "related" to each other through common fields. The most common way to establish a relationship between two tables is to include one or more fields in each table that hold "key" information. A "primary key" field uniquely identifies a record, and commonly is just a number unrelated to other data in the record. Generally, a table can have only one primary key. A "foreign key" field is an identifier in a record that establishes a relationship with a primary key in another table. Unlike primary keys, though, a table can have an unlimited number of foreign keys establishing relationships with an unlimited number of tables. Thus, a primary key and foreign key combination effectively establish a "dependent" relationship, also known as a "parent-child" relationship, wherein the table having the primary key is the "parent" table, and the table having the foreign key is the "child" table.

The integrity of the relationships, though, depends on the foreign key referencing a valid primary key. A foreign key in a record of a child table loses all meaning if the corresponding primary key record in the parent table is unavailable. Thus, all foreign key values must have equivalent primary key values that already exist in the other table. A database management system (DBMS) must carefully manage the relationships between tables in order to provide users with consistent data and maintain referential integrity between tables. Particularly, if a user attempts to delete a record in the parent table without first deleting all corresponding records in the child table, the DBMS must make assumptions about the user's intent. One common assumption is that the user made an error, in which case the DBMS rejects the attempted deletion. Alternatively, the DBMS assumes that the user did not make an error, in which case the DBMS deletes all of the child records before deleting the parent records. In practice, a modern DBMS allows a user to designate foreign key fields and impose rules for managing relationships when the user creates the tables. A rule that causes a DMBS to delete all of the child records when the parent record is deleted is known commonly as a "cascading delete" or a "cascade-on-delete" rule.

For example, a mail order company that sells a variety of products would need to maintain information about their products, as well as orders for those products. The company could store this information in a database for rapid search and retrieval. In particular, the company probably would keep a catalog of available products that uniquely identifies each product, along with a description and the price of each product. The company also would need to keep track of each customer's order, including the customer's name and contact information, as well as the type and number of products ordered. Rather than putting all this information in one large table, though, the company would probably distribute the information in several smaller, related tables. A "PRODUCTS" table would represent the product catalog, and would include a primary key that uniquely identifies each record (thereby uniquely identifying each product). Similarly, an "ORDERS" table would include a primary key uniquely identifying each customer order. A third table, the "ORDER_ITEMS" table, would identify each item in a particular order. Each record in the ORDER_ITEMS table would include a foreign key linking the record to a specific order in the ORDERS table, and a foreign key linking the record to a specific product in the PRODUCTS table. The PRODUCTS and ORDERS tables would be examples of parent tables, while the ORDER_ITEMS table would be an example of a child table. Because the items in each order are represented in a separate table, each order can have a variable, unlimited number of items. But if a customer cancels an order, both the record representing the order and the records representing the items in the order should be deleted. If the ORDERS and ORDER_ITEMS tables include a cascading delete rule, then the DBMS will automatically find the order's child records and delete them before deleting the order.

For many years, computer programmers created client programs that interacted directly with a DBMS server program. In general, a client program provided a user interface to the DBMS and implemented an enterprise's business rules for a particular application, such as entering a customer's order for products. The enterprise data, though, remained relatively centralized and available to multiple clients through the DBMS server program. In recent years, this traditional "two-tier" client/server system has been displaced slowly by more sophisticated multi-tier client/server systems. In general, a multi-tier system places at least one intermediate component between the client and the server. These components are referred to commonly as "middleware." Generalized "n-tier" systems include n layers of software that provide a different layer of services at varying levels of detail to the layers above and beneath them, where n is any number. See Mark Johnson, *A beginner's guide to Enterprise JavaBeans,* JavaWorld, at http://www.javaworld.com (October 1998), incorporated herein by reference. Programmers often use multiple client/server tiers to separate and delegate particular programming tasks. In particular, one tier usually provides a user interface, while a second tier implements an enterprise's business rules. A third tier generally implements the underlying data processing (such as creating a data structure to represent a customer's order in a database).

"Object-oriented" languages and techniques also have become increasingly popular in recent years. In general, an "object" is a named memory unit that contains data and instructions for manipulating that data. In an object-oriented context, the term "attribute" or "property" generally refers to the data within the memory unit, and the term "method" or "procedure" refers to the related instructions for manipulating the data. In practice, objects often include methods that direct the process of storing the object's attributes within a file or database. Of course, an object that includes such a method also generally includes one or more methods that direct other types of operations, such as updating or removing the object in the file or database.

Today, computer programmers frequently build application programs with a mix of n-tiered architectures and object-oriented technology. Sun Microsystems, Inc. (SUN) has developed a comprehensive collection of objects and other supporting programs that programmers can use to build sophisticated transaction processing systems. SUN markets this collection as the JAVA 2 ENTERPRISE EDITION (J2EE) platform. SUN also has developed an application program interface (API) for J2EE that defines an n-tiered architecture, which SUN markets as the ENTERPRISE JAVABEANS (EJB) architecture.

Figure 1:
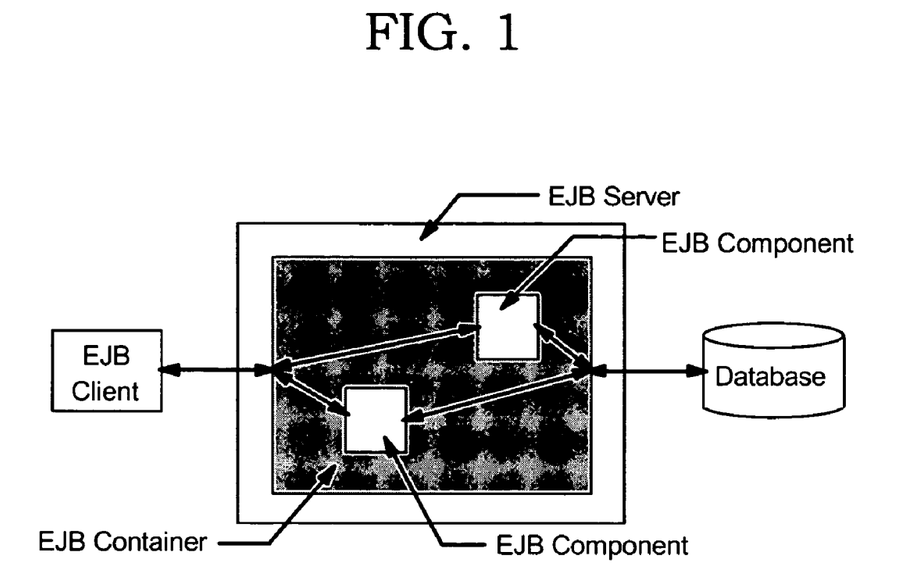
FIG. 1 depicts a typical EJB system architecture.

Generally, an EJB architecture comprises an EJB server, an EJB container, an EJB component (also commonly known as a "bean"), an EJB object, and a database. FIG. 1 depicts a typical EJB system architecture. An EJB component, which typically implements business rules, executes within an EJB container. The EJB container, which implements many of the data processing operations, executes within an EJB server. The EJB server generally executes within any given computer's native environment and provides the EJB container access to low-level computing resources. An EJB object allows a client program to execute the EJB component, through the EJB component's EJB container. Generally, each of these EJB subsystems comprises one or more objects that implement the functions of the subsystem. Thus, the term "EJB client" will be used herein, instead of the term "EJB object," to avoid any confusion with a generic "object."

An "entity bean" is one type of EJB component used to model data in business transactions, the attributes of which are typically stored within a database. The term "persist" generally refers to the process of storing, updating, and deleting such attributes to or from a database. An entity bean may manage the persistence of its attributes, or it may delegate the responsibility to the EJB container in which it executes. An EJB client may explicitly request the entity bean, or the EJB container, to persist the entity bean's attributes. Alternatively, the entity bean or EJB container, as the case may be, may persist the attributes when there is a need, such as occurs when a second EJB client needs to access the attributes in the database.

An entity bean also may have a relationship with one or more other entity beans, much like a table in a database may have a relationship with other tables. Entity bean relationships must be managed much as table relationships must be managed, particularly to maintain referential integrity. In general, an EJB container is responsible for managing bean relationships. Consequently, such a relationship is referred to commonly as a "Container-Managed Relationship" (CMR). An EJB container generally persists a CMR in a database as one or more foreign keys referencing one or more primary keys.

Persons skilled in the art will appreciate that any operation that accesses a database consumes at least some quantity of available computing resources, thereby decreasing the resources available for other computing tasks. Thus, a computer program that frequently accesses a database can decrease computer performance significantly. Likewise, a computer program that accesses a database indirectly through one or more objects, such as an entity bean or container, can cause the same performance reduction.

Currently, in an EJB architecture, and in object-relational-database persistence systems generally, an EJB container and the DBMS system are both responsible for maintaining referential integrity in their respective domains. But if objects are persisted as tables in a database and relationships between objects are mapped with foreign keys, then many of these responsibilities are duplicative and unnecessarily consume valuable computing resources.

Thus, there is a need in the art for a uniform process for minimizing the number of times that a computer program accesses a database to maintain persistent referential integrity. The invention described in detail below addresses this need. This and other objects of the invention will be apparent to those skilled in the art from the following detailed description of a preferred embodiment of the invention.

SUMMARY OF THE INVENTION

The present invention comprises a process for managing entity-relationship data for data objects persisted in a relational database. In particular, the process minimizes the number of database operations needed to maintain persistent referential integrity between data objects, thereby minimizing the number of times that a program accesses the database.

In the preferred embodiment, the inventive process is implemented as an improved container program having a CMR engine that controls the persistence of data object relationships in a relational database. The improved container program comprises one or more referential integrity rules, which control the container program's response to a client object program's instructions that affect entity-relationship data.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention. The term "computer" includes, without limitation, any machine that is capable of processing data and performing logic operations according to a predefined set of instructions. A "program" includes any such predefined set of instructions capable of directing a computer to process data or perform logic operations. While the invention was designed to implement an EJB container, the principles and processes described below are applicable generally to any program designed to manage the referential integrity of objects persisted to a database. Consequently, these principles and processes are described in generic terms rather than terms specific to the EJB architecture.

As used herein, the term "client object program" refers to any object program that has the capacity to communicate with a container program.

The term "container program" refers to any program that must execute within a server program and is capable of executing an object program.

The term "object program" refers to any computer program that implements an object-oriented design, as described above.

The term "server component object" refers to any object program that must execute within a container program.

Figure 2:
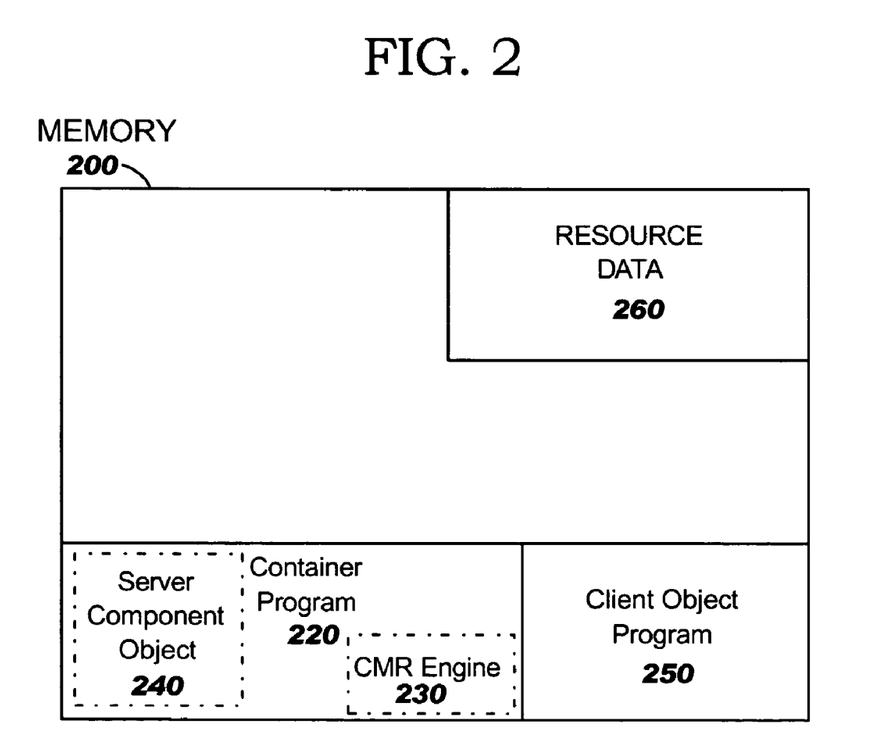
FIG. 2 represents the internal configuration of a computer having the computer program of the present invention loaded into memory.

The internal configuration of a computer, including connection and orientation of the processor, memory, and input/output devices, is well known in the art. FIG. 2 represents the internal configuration of a computer having the computer program of the present invention loaded into memory 200. A "memory," as the term is used herein, is any medium in which a computer can store a computer program or data for any duration, including without limitation electrical circuits, magnetic disks, and optical disks. The computer program of the present invention is depicted as container program 220, which includes CMR engine 230, and may contain one or more server component objects, such as server component object 240. Container program 220 also interfaces with client object program 250 and enables client object program 250 to communicate indirectly with server component object 240. Memory 200 is only illustrative of memory within a computer and is not meant as a limitation. Memory 200 also contains resource data 260. The present invention may interface with resource data 260 through memory 200.

In alternative embodiments, container program 220, server component object 240, and client object program 250 can be stored in the memory of other computers. Storing container program 220 in the memory of other computers allows the processor workload to be distributed across a plurality of processors instead of a single processor. Further configurations of container program 220, server component object 240, and client object program 250 across various multiple memories and processors are known by persons skilled in the art.

Figure 3:
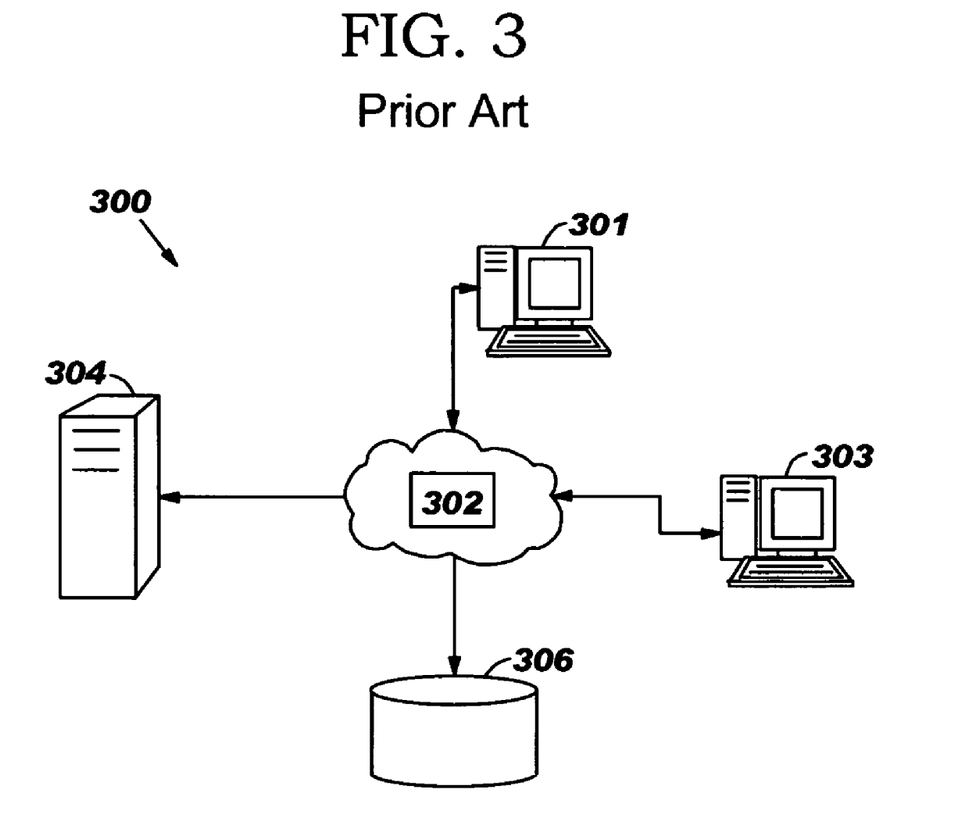
FIG. 3 illustrates a common prior art architecture for connecting various hardware devices to create a network for transferring data.

FIG. 3 illustrates a common prior art architecture for connecting various hardware devices to create a network for transferring data. Computer network 300 comprises local computer 301 electrically coupled to network connection 302. In FIG. 3, local computer 301 is coupled electrically to remote computer 303 via network connection 302. Local computer 301 also is coupled electrically to server computer 304 and persistent storage 306 via network connection 302. Network connection 302 may be a simple local area network (LAN) or may be a larger wide area network (WAN), such as the Internet. While computer network 300 depicted in FIG. 3 is intended to represent a possible network architecture, it is not intended to represent an architectural limitation.

Container program 220, server component object 240, or client object program 250 described herein can be stored within memory 200 of any computer depicted in FIG. 3. Alternatively, container program 220, server component object 240, or client object program 250 can be stored in an external storage device such as persistent storage 306, or a removable disk such as a CD-ROM (not pictured).

Figure 4:
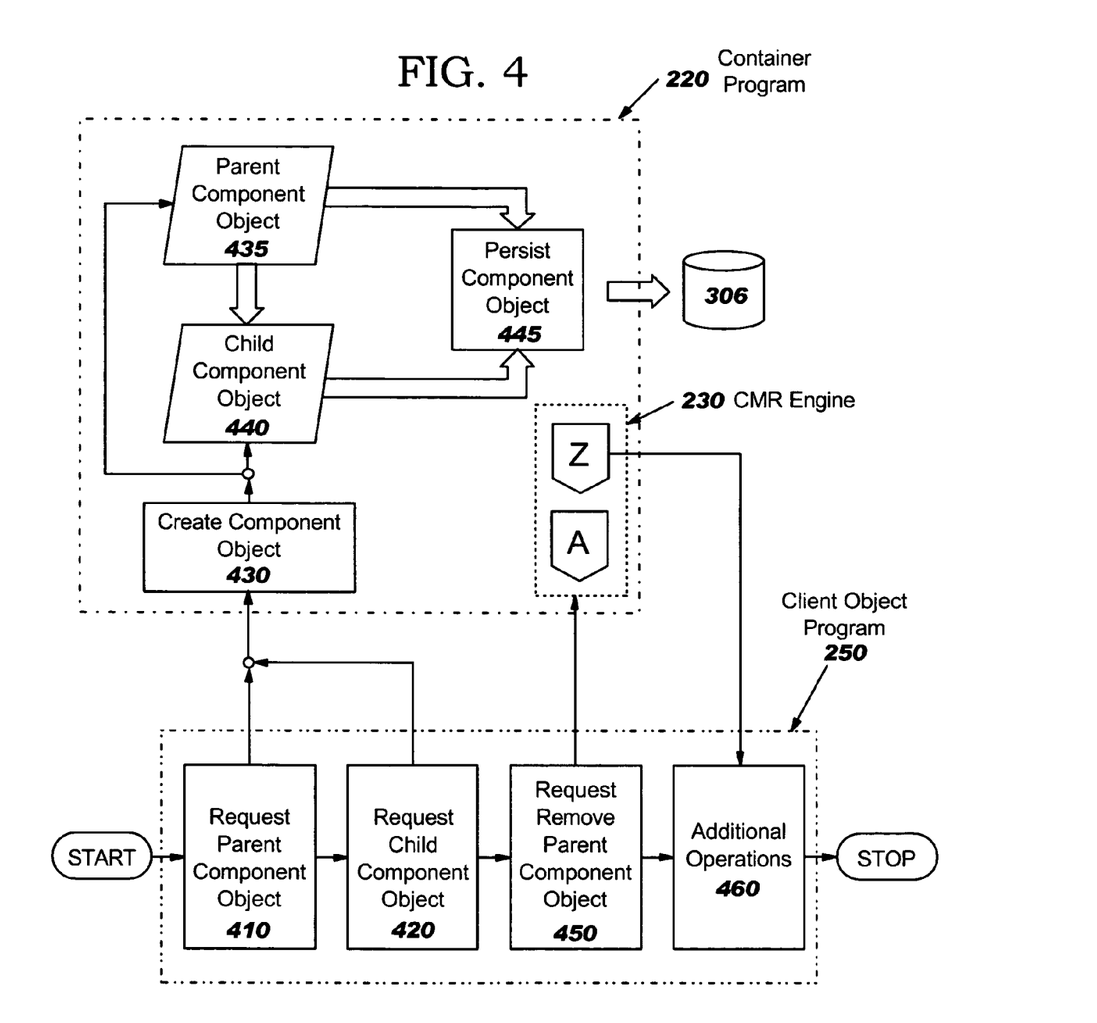
FIG. 4 illustrates a container program and a client object program executing in parallel and interacting with each other.

Container program 220 manages the referential integrity between related server component objects that client object program 250 creates. FIG. 4 illustrates container program 220 and client object program 250 executing in parallel and interacting with each other. FIG. 4 is not intended to represent the entire functional scope of container program 220 or client object program 240, and a person of skill in the art will appreciate that container program 220 and client object program 240 may process data not depicted in FIG. 4.

Referring to FIG. 4 for illustration, client object program 250 requests container program 220 to create a server component object (410), and may request multiple server component objects (420). FIG. 4 depicts a scenario where client object program 250 requests a first server component object (410) and a second server component object that depends on the first server component object (420). For the sake of simplicity, and to emphasize the dependent relationship between the two objects, the first server component object will be referred to as the "parent" component object, and the second server component object will be referred to as the "child" component object. In one embodiment, client object 250 specifies a referential integrity rule that container program 220 should apply to the relationship between the parent component object and the child component object. In this embodiment, client object 250 should specify a NO ACTION, RESTRICTED, CASCADE, or SET NULL referential integrity rule. In an alternative embodiment, container program 220 may read the referential integrity rule from database 306. The NO ACTION rule, in effect, causes container program 220 to behave as a prior art container program with no optimization. Consequently, the NO ACTION RULE is not discussed herein. The effects of the RESTRICTED, CASCADE, and SET NULL rules, however, are described below and illustrated in the accompanying drawings. Responsive to receiving a request from client object program 250 to create the parent component object (410), container program 220 creates parent component object 435 (430). Similarly, container program 220 creates child component object 440 in response to the second request made by client object program 250. Container program also creates a reference that links child component object 440 to parent component object 435, as indicated by the block arrow between child component object 440 and parent component object 435. The reference further indicates that child component object 440 is dependent upon parent component object 435. Container program 220 also persists each server component object to database 306 (445).

Figure 5:
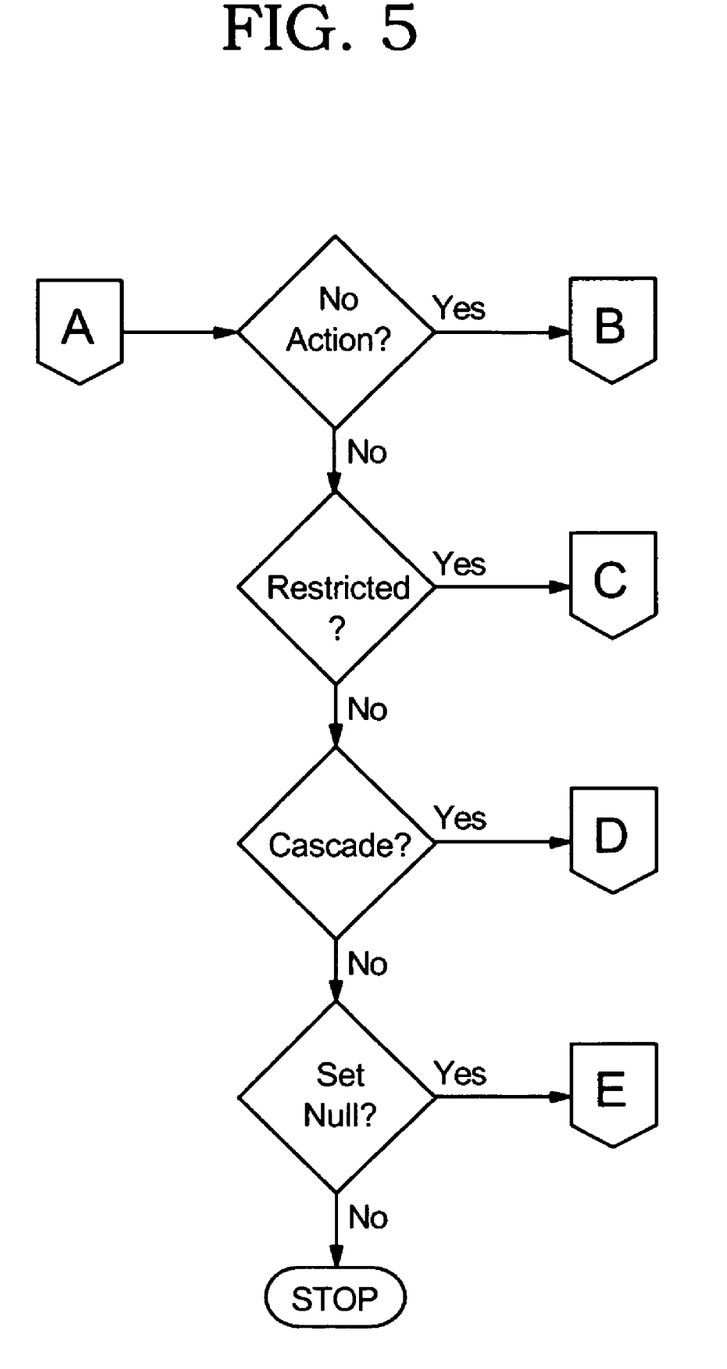
FIG. 5 illustrates a CMR engine applying a referential integrity rule to a server component object.

Then, at some point during operation, client object program 250 requests container program 220 to remove parent component object 435 (450). Responsive to the client object program 240 request (450), CMR engine 230 determines which referential integrity rule client object program has specified for parent component object 435, as depicted in FIG. 5.

Figure 6:
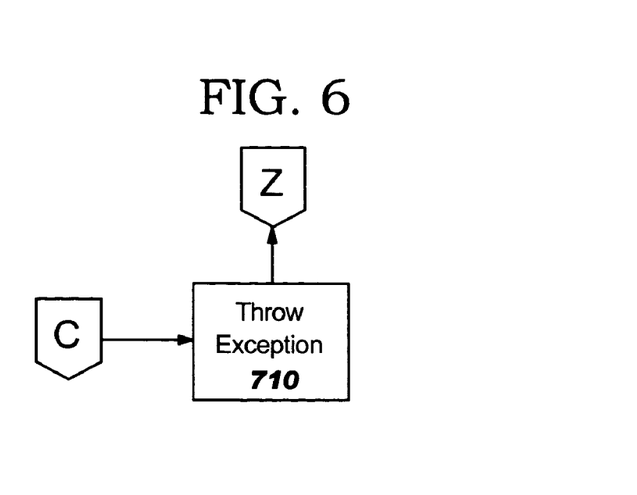
FIG. 6 illustrates an implementation of a RESTRICTED rule.

FIG. 6 illustrates the RESTRICTED rule, as CMR engine 230 applies it to parent component object 435. As illustrated in FIG. 6, the RESTRICTED rule causes CRM engine 230 to throw an exception to client object program 250 (710). The exception indicates that client object program 250 has attempted to remove parent component object 435 without first removing child component object 440. Conversely, prior art container programs without CRM engine 230 would pass the request from client object program 250 to database 306, where a DBMS would generate a similar error. Thus, CRM engine 230 eliminates the need to access database 306 when such an access would result in an error anyway.

Figure 7:
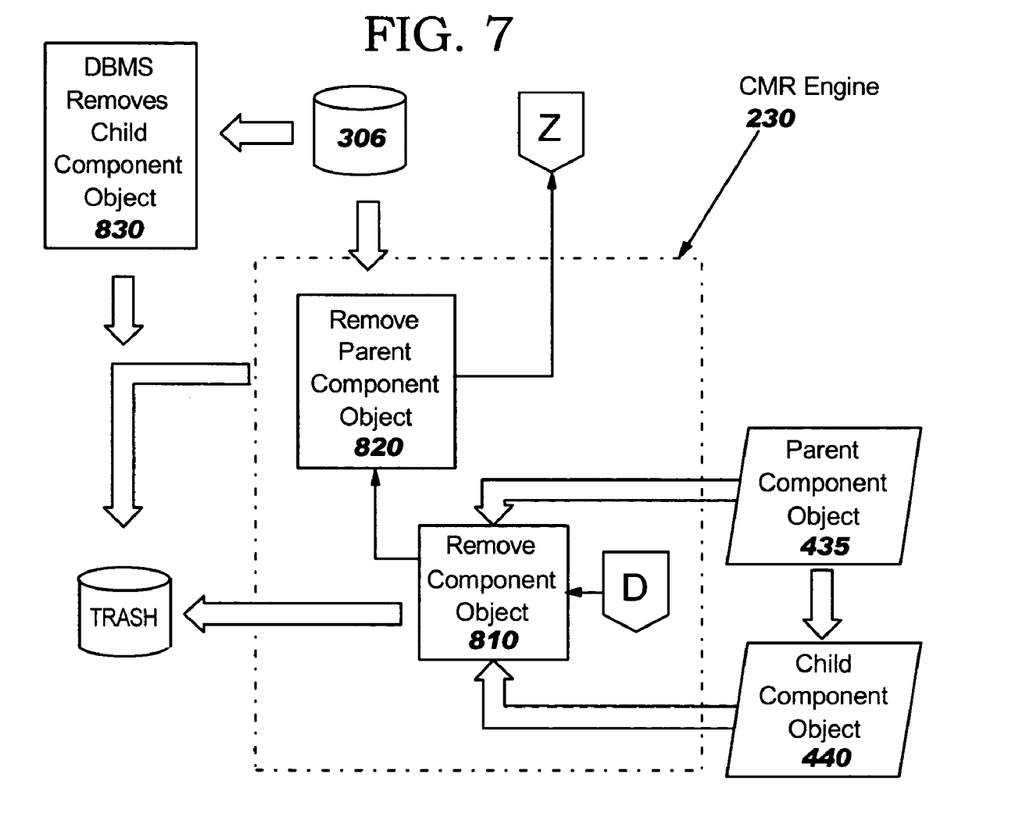
FIG. 7 illustrates an implementation of a CASCADE rule.

FIG. 7 illustrates the CASCADE rule, as CMR engine 230 applies it to parent component object 435. The CASCADE, as implemented in CMR engine 230, is very similar to the cascade-on-delete rule commonly used in a DBMS, and in fact, relies on such a cascade-on-delete rule to minimize the number of times that container program 220 needs to access database 306 when removing parent component object 435 and child component object 440. As illustrated in FIG. 7, CMR engine 230 removes parent component object 435 and child component object from memory (810), and then removes parent component object 435 from database 306 (820). Database 306, or more specifically a DBMS in database 306, then applies a cascade-on-delete rule to remove child component object from database 306 (830).

Figure 8:
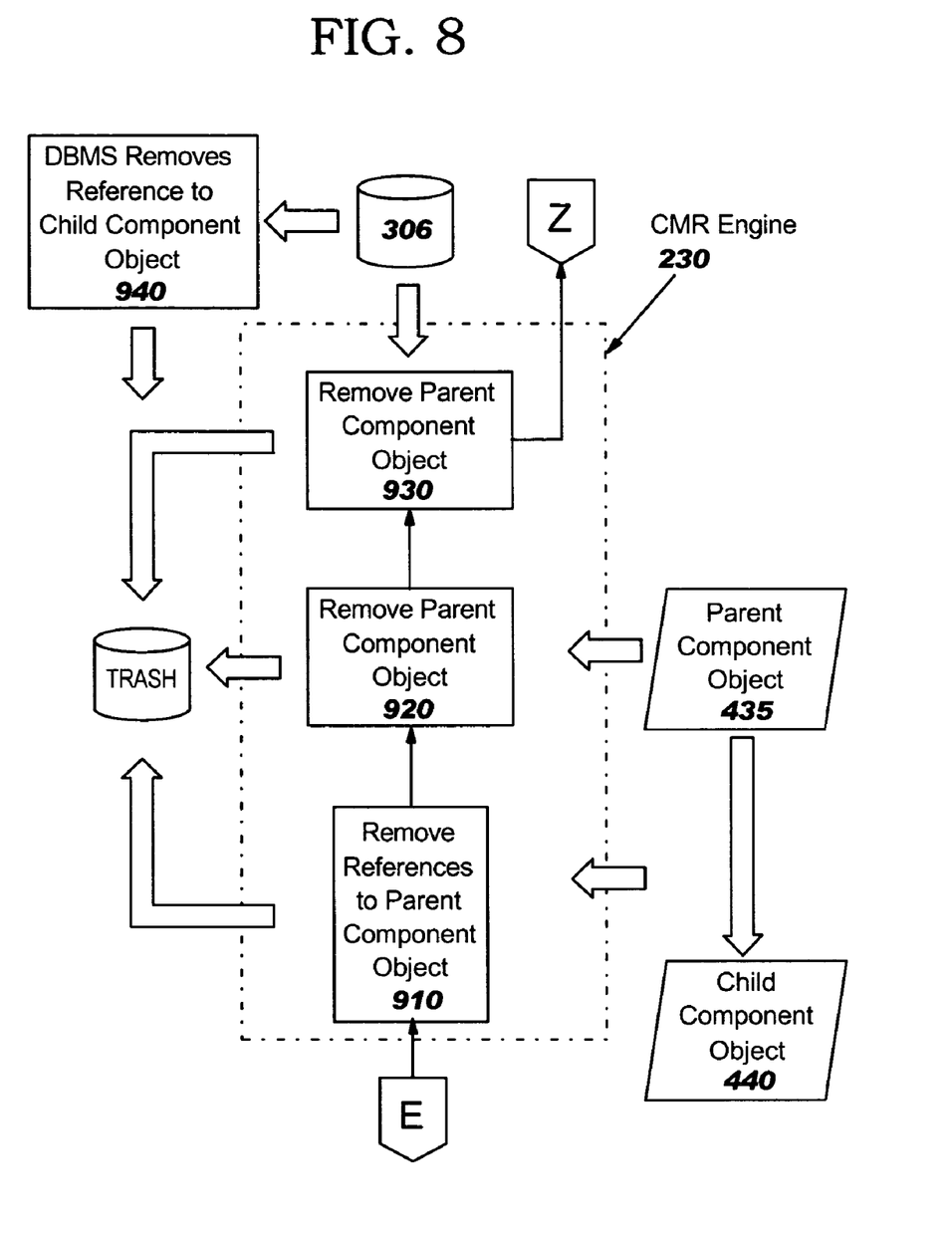
FIG. 8 illustrates an implementation of a SET NULL rule.

FIG. 8 illustrates the SET NULL rule, as CMR engine 230 applies it to parent component object 435. The SET NULL rule causes CMR engine to set the reference in child component object 440 to parent component object 435 to a null value (910). CMR engine 230 then removes parent component object 435 from memory (920) and from database 306 (930). A DBMS in database 306 then applies a similar set-null rule to set the foreign key of child component object 440 in database 306 to a NULL value (940).

Although only one container program, one parent component object, one child component object, and one client object program are represented in the figures and corresponding descriptions above, a person of ordinary skill in the art will be able to apply the same principles and processes to more than one of each.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A machine to manage entity-relationship data for data objects persisted in a relational database and to reduce a number of database operations needed to maintain persistent referential integrity between a plurality of data objects, comprising:

a computer having a processor and a memory, the computer connected by a network to a relational database;

a container managed relationship engine, a container program, and a client object program in the memory;

wherein, when the client object program requests the container program to create a parent component object and to create a child component object that depends on the parent component object, the client object program specifies a RESTRICTED rule, a CASCADE rule, or a NULL rule for the relationship between the parent component object and the child component object;

wherein, responsive to the container program creating the parent component object and the child component object, the container program creates a reference that links the child component object to the parent component object, indicates that the child component object is dependent upon the parent component object, and persists the parent component object and the child component object to the database;

wherein, when the client object program requests the container program to remove the parent component object, the container managed relationship engine applies a referential integrity rule specified by the client object program for the parent component object;

wherein, when the RESTRICTED rule is specified, the container managed relationship engine throws an exception to the client object program, the exception indicating that the client object program has attempted to remove the parent component object without first removing the child component object, whereby the container managed relationship engine eliminates a need to access the relational database where such access would result in an error;

wherein, when the CASCADE rule is specified, the container managed relationship engine removes the parent component and the child component from the memory and then removes the parent component object from the database wherein a database management system in the database then applies a cascade-on-delete rule to remove the child component object from the database;

wherein, when the NULL rule is specified, the container managed relationship engine sets the reference in the child component object to a null value, removes the parent component object from the memory and from the database, and the database management system in the database applies a set-null rule to set the foreign key of the child component object in the database to a NULL value; and wherein the number of database operations needed to maintain persistent referential integrity between a plurality of data objects is reduced.

* * * * *